United States Patent
Matsuo et al.

(10) Patent No.: US 9,846,819 B2
(45) Date of Patent: Dec. 19, 2017

(54) MAP IMAGE DISPLAY DEVICE, NAVIGATION DEVICE, AND MAP IMAGE DISPLAY METHOD

(71) Applicant: TOYOTA JIDOSHA KABUSHIKI KAISHA, Toyota-shi, Aichi-ken (JP)

(72) Inventors: Yuka Matsuo, Toyoake (JP); Kazunori Watanabe, Okazaki (JP); Xin Jin, Nagoya (JP)

(73) Assignee: TOYOTA JIDOSHA KABUSHIKI KAISHA, Tokyo (JP)

( * ) Notice: Subject to any disclaimer, the term of this patent is extended or adjusted under 35 U.S.C. 154(b) by 4 days.

(21) Appl. No.: 15/070,818

(22) Filed: Mar. 15, 2016

(65) Prior Publication Data
US 2016/0275715 A1 Sep. 22, 2016

(30) Foreign Application Priority Data

Mar. 18, 2015 (JP) ................................. 2015-054802

(51) Int. Cl.
| | |
|---|---|
| *G06T 17/05* | (2011.01) |
| *G06K 9/46* | (2006.01) |
| *G06T 19/20* | (2011.01) |
| *G01C 21/36* | (2006.01) |

(52) U.S. Cl.
CPC ....... *G06K 9/4661* (2013.01); *G01C 21/3638* (2013.01); *G06T 17/05* (2013.01); *G06T 19/20* (2013.01); *G06T 2219/2012* (2013.01)

(58) Field of Classification Search
None
See application file for complete search history.

(56) References Cited

U.S. PATENT DOCUMENTS

| | | | | |
|---|---|---|---|---|
| 5,999,879 A | * | 12/1999 | Yano | .................... G08G 1/0969 |
| | | | | 340/988 |
| 2002/0123841 A1 | * | 9/2002 | Satoh | ................. G01C 21/3638 |
| | | | | 701/532 |
| 2007/0047809 A1 | * | 3/2007 | Sasaki | ................ G06K 9/00791 |
| | | | | 382/170 |

FOREIGN PATENT DOCUMENTS

JP 2006-317764 A 11/2006

* cited by examiner

*Primary Examiner* — Ryan M Gray
(74) *Attorney, Agent, or Firm* — Oliff PLC

(57) ABSTRACT

In a case where a specific point is designated on a map, extracted structure data, which is data of structures contained in an extraction range defined in advance with respect to the specific point as a datum, is extracted from map data. In a case where multiple extracted structure data items are extracted, at least one structure, the evaluated value of which is different from evaluated values of other structures by a selection threshold value or greater for a selection index, is selected as a landmark structure. A three-dimensional map image containing at least a road image and a structure image is displayed on a display screen in an emphasized manner such that the selected landmark structure offers visibility higher than visibility non-emphasized structures.

7 Claims, 9 Drawing Sheets

MAP IMAGE DISPLAY DEVICE, NAVIGATION DEVICE, AND MAP IMAGE DISPLAY METHOD

INCORPORATION BY REFERENCE

The disclosure of Japanese Patent Application No. 2015-054802 filed on Mar. 18, 2015 including the specification, drawings, and abstract is incorporated herein by reference in its entirety.

BACKGROUND OF THE INVENTION

1. Field of the Invention

The invention relates to technology of displaying a map image on a display screen.

2. Description of Related Art

A navigation device may include a map image display device that displays a map image in which structures are stereographically depicted. A stereographic map image serves to offer improved visibility to a user. Since there are many structures in urban areas or the like, in a case where all of the structures are displayed under the same conditions, visibility may deteriorate. Japanese Unexamined Patent Application Publication No. 2006-317764 (JP 2006-317764A) proposes technology of reducing deterioration of visibility by emphasizing structures in different degrees which are contained in the a displayed map image. The technology proposed in JP 2006-317764A determines a structure to be emphasized based on the fact that a human is likely to pay attention to nearby structures but particularly, is unlikely to pay attention to distant and small structures. Specifically, multiple structures are determined and displayed such that a structure closer to a reference position and higher than other structures is emphasized (refer to second to seventh paragraphs and the like in JP 2006-317764A).

The density of structures is high, and there are many high-rise structures in urban areas of a large city. For this reason, even if a structure to be displayed in an emphasized manner is selected based on the distance to the reference position or the height of the structure, a large number of structures may become selection targets. As a result, the structures may not serve as landmarks, and convenience may be decreased.

SUMMARY OF THE INVENTION

In light of the aforementioned background, it is desirable to provide technology of being able to properly select a structure as a landmark, and to display the structure in an emphasized manner, even in a place where many structures are present.

According to an aspect of the invention, there is provided a map image display device that displays at least a map image on a display screen, the device including: a map data acquisition unit configured to acquire map data; a display controller configured to display a three-dimensional map image containing at least a road image and a structure image on the display screen, based on the map data; a data extraction unit configured to extract extracted structure data, which is data of structures contained in an extraction range defined in advance with respect to a specific point as a datum, from the map data in a case where the specific point is designated on a map; and a landmark selection unit configured to select a structure, which corresponds to at least one item of extracted structure data among multiple extracted structure data items in a case where the multiple extracted structure data items are extracted, as a landmark structure. The landmark selection unit selects at least one structure, the evaluated value of which is different from evaluated values of the other structures by a selection threshold value or greater, as the landmark structure based on the extracted structure data, the evaluated value relating to one or multiple selection indices defined in advance. The display controller displays the structure image on the display screen in an emphasized manner such that the selected landmark structure offers visibility higher than visibility non-emphasized structures which are structures other than the landmark structure.

In this configuration, since the structure, the evaluated value of which is different from evaluated values of the other structures by the selection threshold value or greater, is displayed in an emphasized manner as the landmark structure among the structures contained in the extraction range, a characteristic structure different from the other structures can be displayed on the display screen in a more prominent manner. The landmark structure is selected by relative evaluation based on whether or not the evaluated value of a structure, which becomes the landmark structure, is different from the evaluated values of the other structures by the selection threshold or greater. That is, since the evaluated value of a structure, which becomes the landmark structure, is not absolutely evaluated with respect to a predetermined reference, it is possible to reduce a possibility that many structures satisfying the reference are present, and many landmark structures are selected. A structure, which is characteristic, in other words, prominent compared to other structures, can be selected as the landmark structure by relative evaluation. In this configuration, it is possible to properly select a structure which becomes the landmark structure, and to display the structure in an emphasized manner, even in a place where many structures are present.

Various technical characteristics of the map image display device can also be applied to a map image display method and a map image display program. Hereinafter, representative aspects will be exemplarily illustrated. The map image display method is capable of having the characteristics of the map image display device. The map image display program is capable of causing a computer to realize various functions including the characteristics of the map image display device. Naturally, the map image display method and the map image display program are also capable of having effects of the map image display device. Various additional characteristics exemplarily illustrated as preferred aspects of the map image display device in the following description of embodiments can also be incorporated into the map image display method or the map image display program. The method and the program are capable of providing effects corresponding to the additional characteristics.

According to a preferred aspect of the invention, there is provided a map image display method in which at least a map image is displayed on a display screen, the method including: acquiring map data via a map data acquisition unit; displaying a three-dimensional map image containing at least a road image and a structure image on the display screen, via a display controller based on the map data; extracting extracted structure data, which is data of structures contained in an extraction range defined in advance with respect to a specific point as a datum, from the map data in a case where the specific point is designated on a map, via a data extraction unit; and selecting a structure, which corresponds to at least one item of extracted structure data among multiple extracted structure data items in a case where the multiple extracted structure data items are extracted, as a landmark structure via a landmark selection unit. When a structure corresponding to the extracted structure data is selected as a landmark structure, at least one structure, the evaluated value of which is different from evaluated values of the other structures by a selection threshold value or greater, as the landmark structure based on the extracted structure data, the evaluated value relating to one or multiple selection indices defined in advance. When the display controller displays a three-dimensional map image containing at least a road image and a structure image on the display screen based on the map data, the structure image is displayed on the display screen in an emphasized manner such that the selected landmark structure offers visibility higher than visibility of non-emphasized structures which are structures other than the landmark structure.

According to a preferred aspect of the invention, there is provided a map image display program by which at least a map image is displayed on a display screen, the program causing a computer to realize: a map data acquisition function in which a map data acquisition unit acquires map data; a display control function in which a display controller displays a three-dimensional map image containing at least a road image and a structure image on the display screen based on the map data; a data extraction function in which a data extraction unit extracts extracted structure data, which is data of structures contained in an extraction range defined in advance with respect to a specific point as a datum, from the map data in a case where the specific point is designated on a map; and a landmark selection function in which a landmark selection unit selects a structure, which corresponds to at least one item of extracted structure data among multiple extracted structure data items in a case where the multiple extracted structure data items are extracted, as a landmark structure. In the landmark selection function, at least one structure, the evaluated value of which is different from evaluated values of the other structures by a selection threshold value or greater, as the landmark structure based on the extracted structure data, the evaluated value relating to one or multiple selection indices defined in advance. In the display control function, the structure image is displayed on the display screen in an emphasized manner such that the selected landmark structure offers visibility higher than visibility of non-emphasized structures which are structures other than the landmark structure.

The characteristics and advantages of the invention become apparent from the description of the embodiments given with reference to the accompanying drawings.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
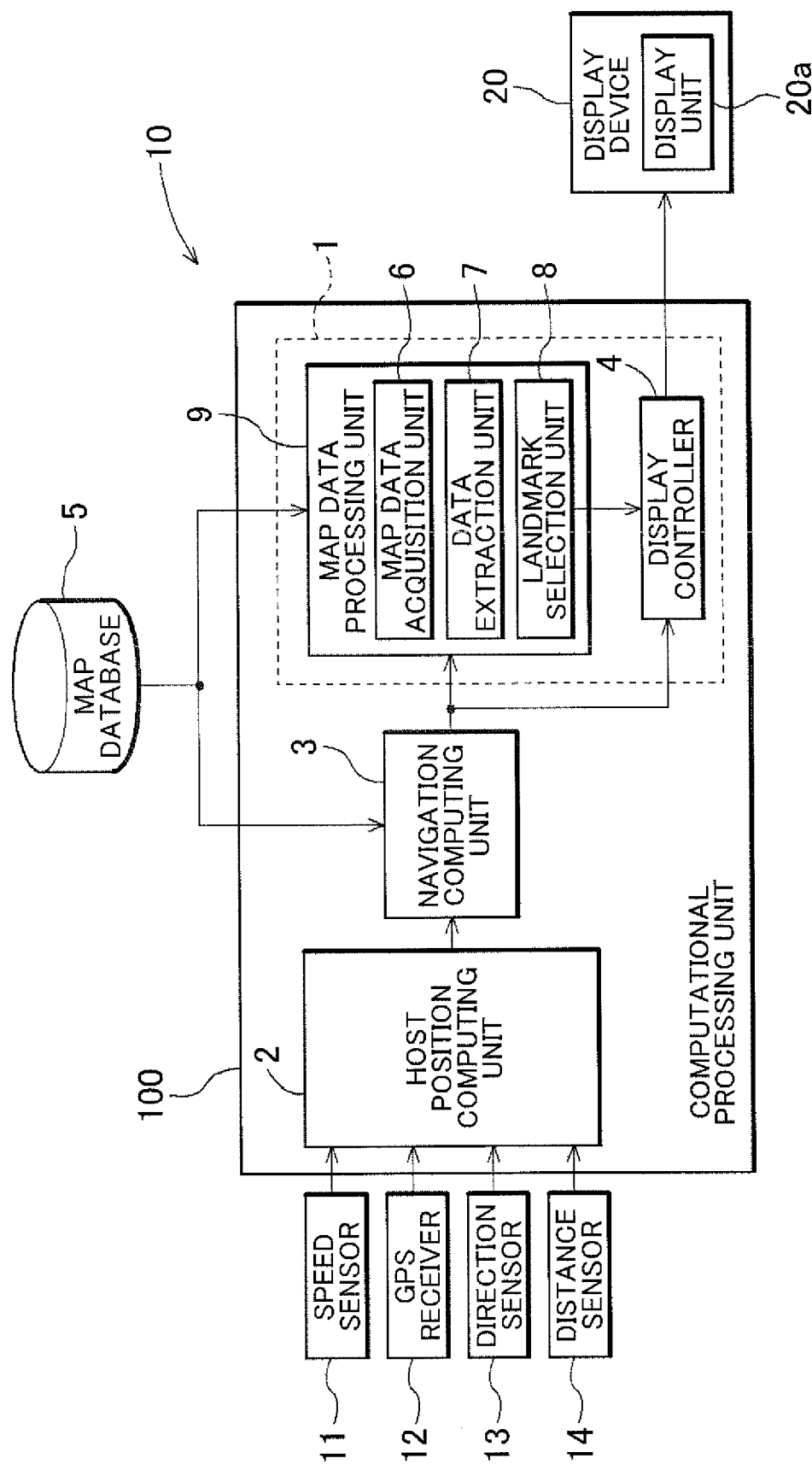
FIG. 1 is a schematic block diagram of a navigation device including a map image display device.

Hereinafter, an exemplary embodiment of a map image display device will be described with reference to the accompanying drawings. FIG. 1 illustrates a case in which a map image display device 1 is applied to a navigation device 10. The navigation device 10 includes the map image display device 1, and is a device that guides a path based on a computation result from a navigation computing unit (path guiding unit) 3. The navigation device 10 provides guidance information regarding a point or path to a user. Configuration elements of the navigation device 10 may be provided in common hardware, or in multiple items of hardware capable of communicating with each other. In the embodiment, the navigation device 10 is a vehicle navigation system that provides guidance information to a user, for example, a passenger (particularly, a driver) of a vehicle. Each of the configuration elements of the navigation device 10 may be provided in a vehicle-mounted device, or in an external device (server or the like) capable of communicating with vehicle-mounted devices via a communication network (Internet or the like). Examples of the vehicle-mounted device include not only a device that is fixedly mounted in a vehicle, but also a device (a portable navigation device, a mobile information terminal device, a multi-functional mobile phone, or the like) that is brought into and used inside of a vehicle.

The navigation device 10 executes various navigation programs containing a map image display program executed by the map image display device 1. In the embodiment, the navigation device 10 is configured to include a computational processing unit 100 as a core component including computational processing devices such as microcomputers and digital signal processors (DSPs) as core members. The computational processing unit 100 realizes various functions of the navigation device 10 and the map image display device 1 in collaboration with the computational processing devices such as microcomputers, storage mediums such as memories and disc devices, hardware such as peripheral circuits, and software such as programs and parameters used on the hardware. FIG. 1 does not illustrate all of the storage mediums, the peripheral circuits, and the like of the navigation device 10 and the map image display device 1.

The computational processing unit 100 includes functional units such as a host position computing unit 2, the navigation computing unit (path guiding unit) 3, a display controller 4, and a map data processing unit 9, which are configured with hardware and software. The host position computing unit 2 is a functional unit that specifies a host position indicating the current position of the navigation device 10. The host position computing unit 2 executes a host position information acquisition process in which host position information is acquired from a speed sensor 11, a GPS receiver 12, a direction sensor 13, and a distance sensor 14, and a host position specifying process in which a host position is specified based on the host position information, which will be described in detail later. The navigation computing unit 3 acquires at least map information regarding the vicinity of the host position from a map database (map DB) (map data storage unit) 5, and guides a path to a destination in a case where the destination is set.

The display controller 4 is configured to include a graphic controller and the like as core components. The display controller 4 generates a map image in collaboration with the navigation computing unit 3 and the map data processing unit 9, based on the host position information and the map information, and displays the map image on a display unit (display screen) 20a of the display device 20. The display controller 4 outputs image data (for example, map images) according to specifications of the display unit 20a. The display device 20 may be a display input device into which an input device such as a liquid crystal display or a touch panel is integrated, or may be a device that projects a display screen onto a wind shield of a vehicle. In these cases, the liquid crystal display and the wind shield correspond to the display screens.

The host position computing unit 2 computes and acquires the host position by using global positioning system (GPS) surveying, or autonomous control via dead reckoning. The GPS surveying is performed by using the GPS receiver 12. The autonomous control is performed based on an advancing speed detected by the speed sensor 11, an advancing direction detected by the direction sensor 13, and an advancing distance detected by the distance sensor 14.

Map data used by the navigation device 10 is stored in the map database 5. The map database 5 is realized by a magnetic disc device, a solid state drive (SSD), or the like. The map data stored in the map database 5 contains road information and feature information. The road information is road network information, and contains information regarding nodes corresponding to intersection points, and information regarding links corresponding to roads through which nodes are connected to each other. The link information refers to information regarding the positions (coordinate) of starting and ending points of links, the lengths of links, the number of lanes, road widths, road types, and the like. The road types are road classifications including an expressway, a toll road, a national road, a prefectural road, and the like. The feature information refers to information regarding various features provided on roads or the vicinities of roads. The feature information contains information regarding the positions and attributes of features. Features, on which the map database 5 stores feature information, include stereographic features which are stereographic structures. Examples of the stereographic features include structures such as buildings and bridges, tunnels, signboards, and signs. In a case where a stereographic feature is a structure, information regarding the attributes of the feature refers to information regarding the type, name, size (width, depth, and height), design (color and shape), and the like of the feature.

With reference to the map data stored in the map database 5, the map image display device 1 executes a map image display process for displaying a map image (for example, a map image of the vicinity of a host position) on the display device 20. The map image display device 1 is configured to be capable of displaying such a stereographic map image (three-dimensional map image) illustrated in FIG. 3 in addition to such a planar map image (two-dimensional map image) illustrated in FIG. 2 on the display device 20. The three-dimensional map image referred to here is an image in which structures are depicted in two dimensions (image in which structures are depicted on a two-dimensional plane) similar to a two-dimensional map image, but stereographic features such as structures B are stereographically depicted unlike a two-dimensional map image. Feature information regarding stereographic features stored in the map database 5 contains information (for example, polygonal data) indicating the three-dimensional shapes of the stereographic features. With reference to the information regarding the three-dimensional shapes of the stereographic features stored in the map database 5, the map image display device 1 generates a three-dimensional map image in which stereographic features are stereographically depicted.

Figure 2:
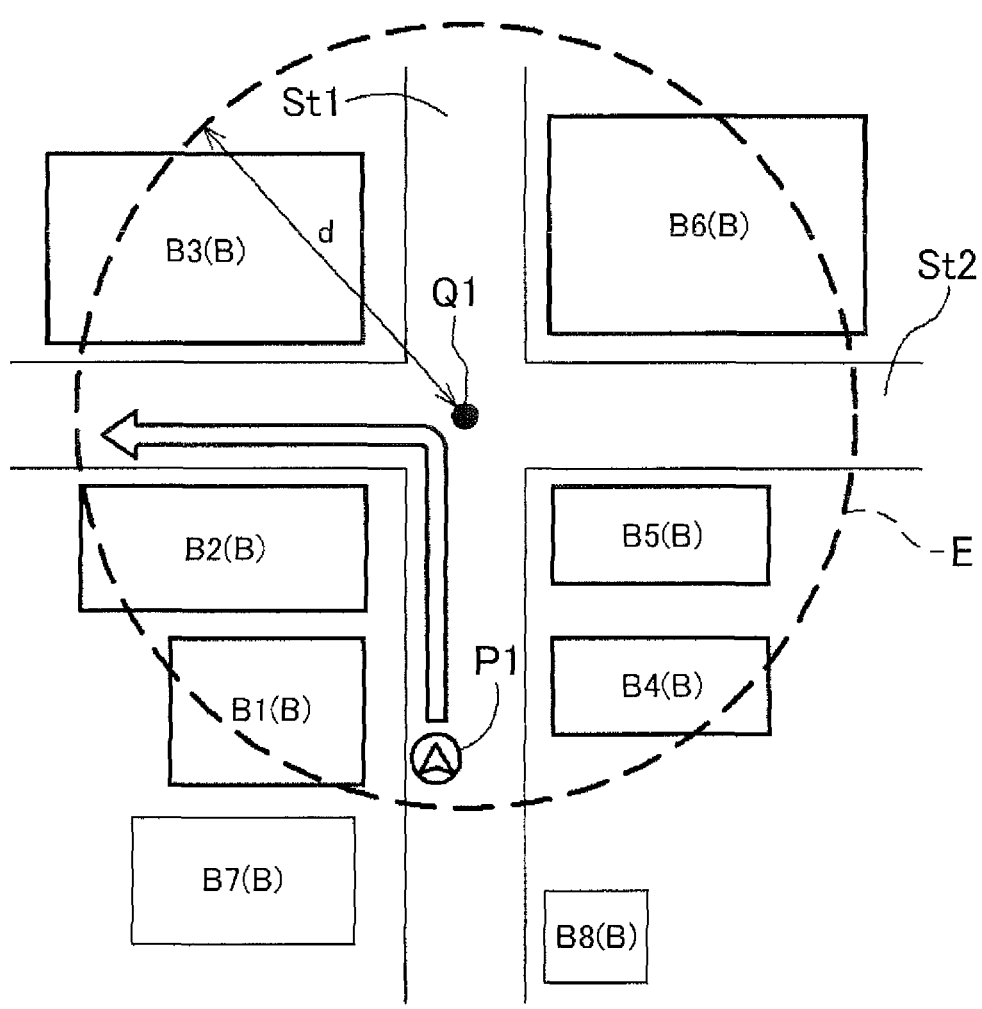
FIG. 2 is a view illustrating a relationship between a specific point and structures.
Figure 3:
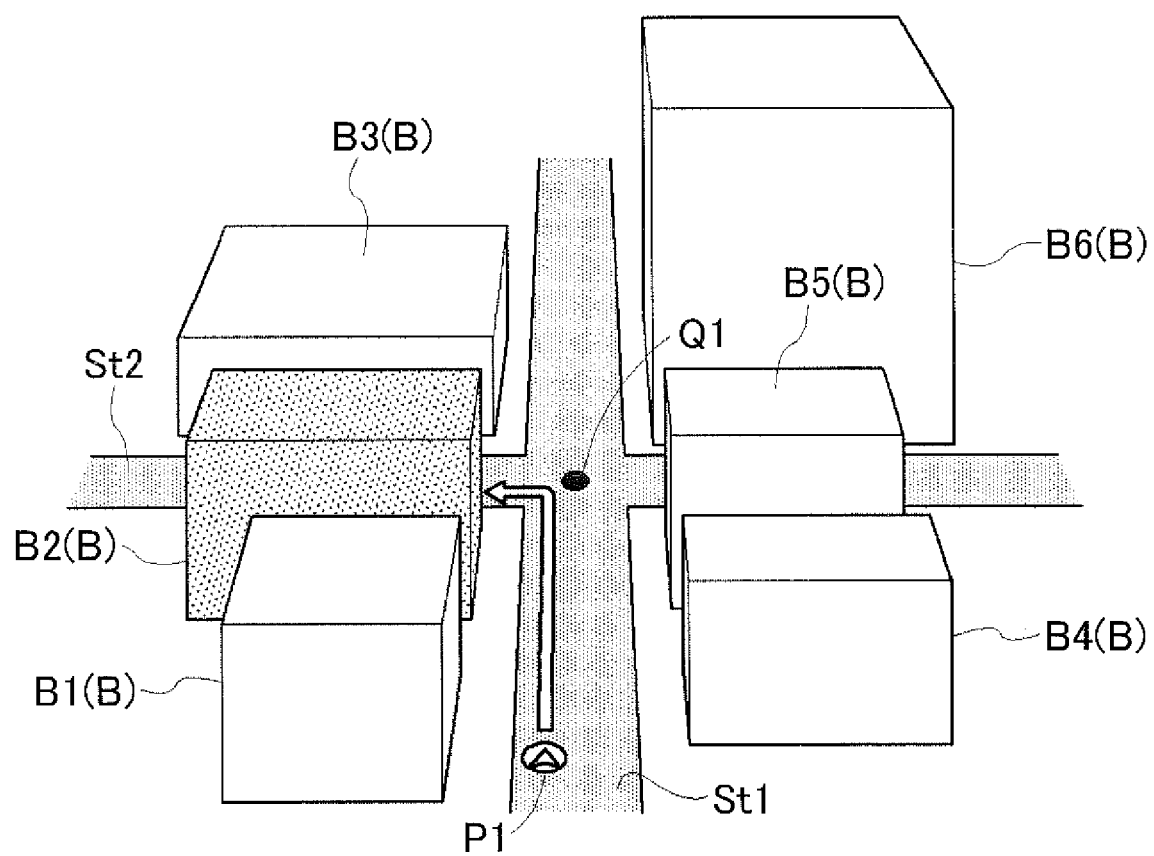
FIG. 3 is a schematic view illustrating a three-dimensional map image displayed on a display screen.

FIG. 2 illustrates an example in which the navigation computing unit 3 guides a path such that a vehicle (the navigation device 10) at a host position P1 turns left at a guidance point (Q1). In a case where a two-dimensional map image is displayed on the display device 20, substantially similar to FIG. 2, the map image display device 1 provides a planar map image with the overlapped arrow or the like to a user. In a case where a three-dimensional image is displayed on the display device 20, as illustrated in FIG. 3, the map image display device 1 provides a stereographic map image with the overlapped arrow or the like to a user. A stereographic map image is very similar to an actual scene seen by a user, and offers high visibility. The density of the structures B is high and there are many high-rise structures in urban areas of a large city. For this reason, the structures B stereographically depicted may not serve as landmarks, and convenience may deteriorate.

Even in a place where many such structures B are present, the map image display device 1 in the embodiment properly selects a structure B as a landmark, and displays the structure B in an emphasized manner. For this purpose, the map image display device 1 includes the map data processing unit 9 and the display controller 4. The map data processing unit 9 includes a map data acquisition unit 6; a data extraction unit 7; and a landmark selection unit 8.

The map data acquisition unit 6 is a functional unit that acquires map data from the map database 5. The display controller 4 is a functional unit that displays a three-dimensional map image containing at least a road image and a structure image on the display unit (display screen) 20a based on the map data acquired from the map data acquisition unit 6. In a case where the specific point Q1 is designated on a map as illustrated in FIG. 2, the data extraction unit 7 is a functional unit that extracts extracted structure data, which is data of the structures B contained in an extraction range E defined in advance with respect to the specific point Q as a datum, from the map data acquired from the map data acquisition unit 6. In a case where the data extraction unit 7 extracts multiple extracted structure data items, the landmark selection unit 8 is a functional unit that selects a structure B, which corresponds to at least one item of extracted structure data among the multiple extracted structure data items, as a landmark structure LM (refer to FIGS. 4 and 5). The landmark selection unit 8 selects at least one structure B, the evaluated value of which is different from evaluated values of other structures B by a selection threshold value or greater, based on the extracted structure data extracted by the data extraction unit 7, as the landmark structure LM, the evaluated value relating to one or multiple selection indices defined in advance, which will be described in detail later. The display controller 4 displays a structure image on the display unit 20a in an emphasized manner such that the landmark structure LM selected by the landmark selection unit 8 offers visibility higher than visibility of non-emphasized structures GB which are structures B other than the landmark structure LM (refer to FIGS. 4 and 5).

Figure 4:
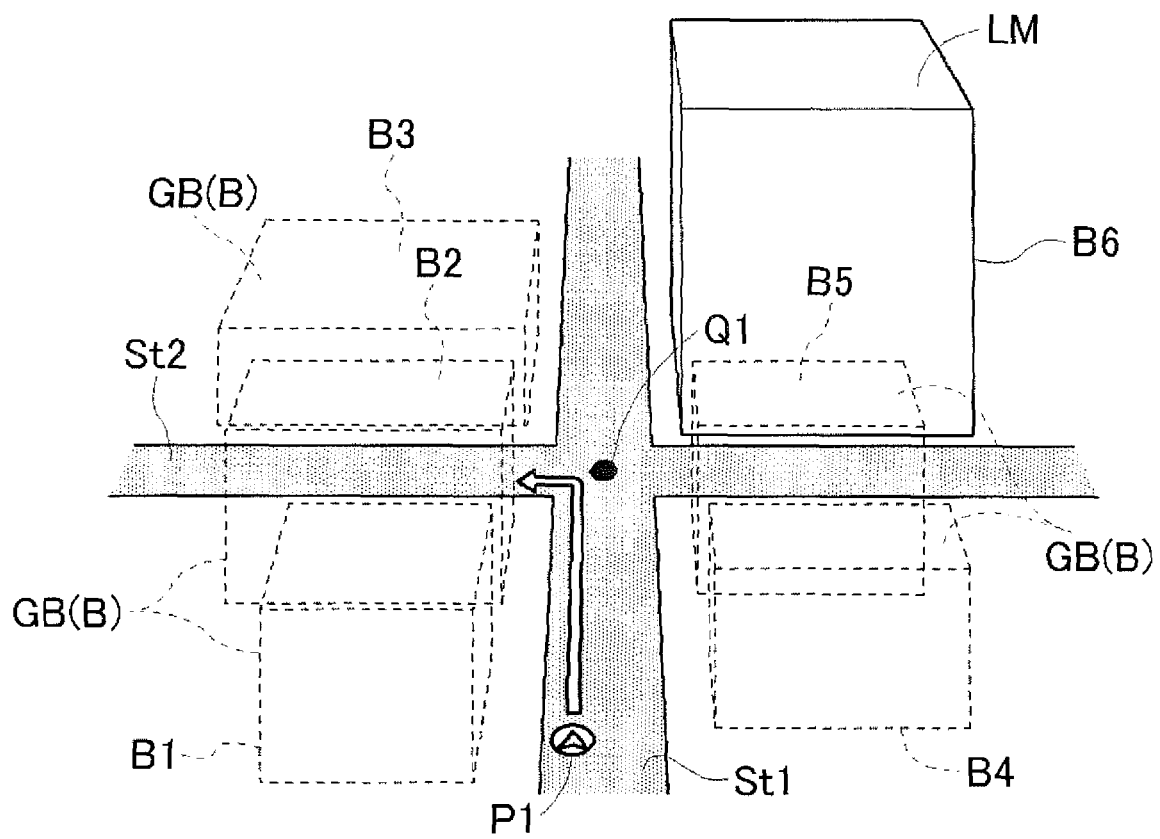
FIG. 4 is a schematic view illustrating an example in which a landmark structure is displayed in an emphasized manner.
Figure 5:
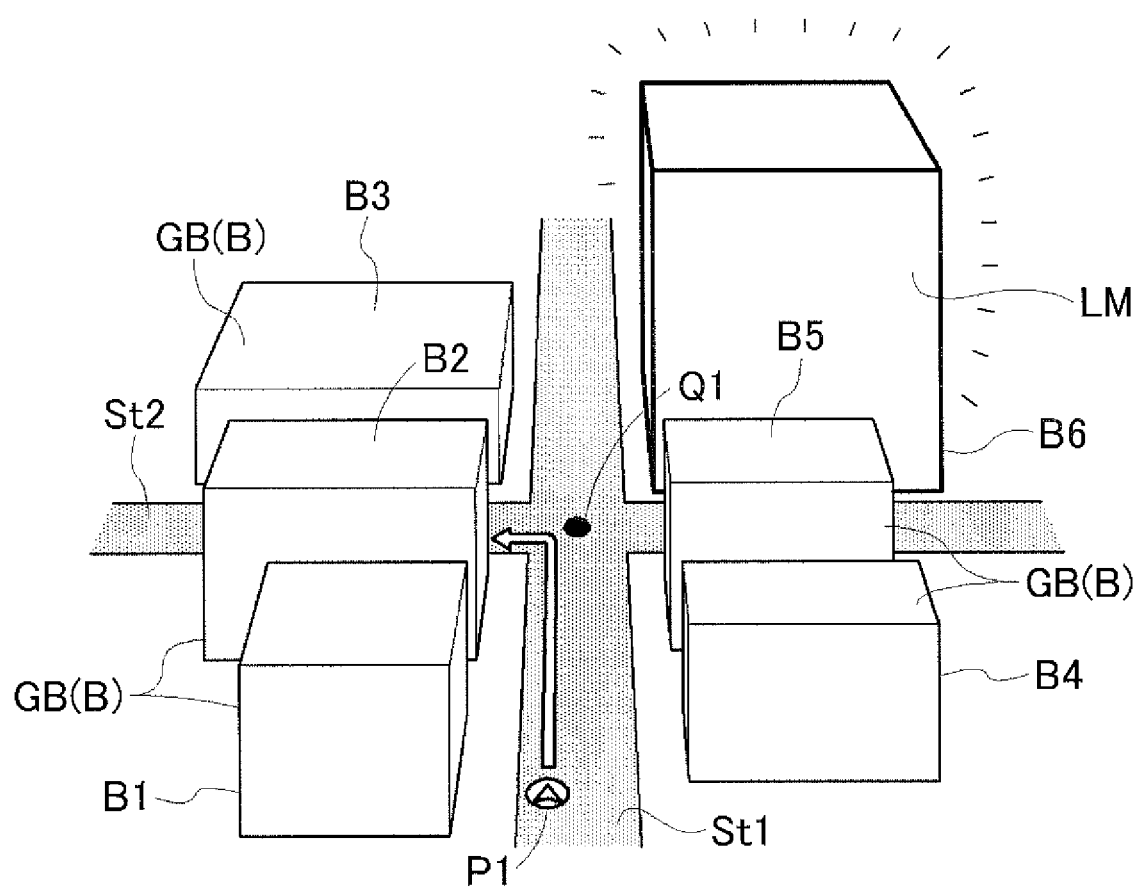
FIG. 5 is a schematic view illustrating another example in which a landmark structure is displayed in an emphasized manner.

FIGS. 4 and 5 schematically illustrate examples in which the landmark structure LM is displayed in an emphasized manner. In FIGS. 4 and 5, the structure B represented by reference sign B6 is the landmark structure LM, and the structures B represented by reference signs B1 to B5 are the non-emphasized structures GB. FIG. 4 illustrates an example in which a structure image of the landmark structure LM is a non-transparent image, and structure images of the non-emphasized structures GB are transparent images. A transparent image is not necessarily completely transparent, and structures may be displayed using light colors in a transparent image. A transparent image may be an image from which the structure images of the non-emphasized structures GB are removed. FIG. 5 illustrates an example in which the structure image of the landmark structure LM is dynamically displayed, that is, which is periodically changed, and the structure images of the non-emphasized structures GB are statically displayed in an image where a change is smaller than a change in which the structure image of the landmark structure is dynamically displayed. The dynamic display refers to display in which a structure image is periodically flickered to the extent that human's eyes can differentiate a change between display and non-display even after an afterimage effect of the human's eyes is taken into consideration. At least one of brightness and chroma of the structure image of the landmark structure LM may be set to be higher than at least one of brightness and chroma of the structure images of the non-emphasized structures GB, which is not illustrated.

Hereinafter, the order of selecting the landmark structure LM will be described. First, an example, in which the landmark structure LM is selected by using the heights of the structures B, will be described with reference to FIGS. 6 and 7. In the embodiment, as illustrated in FIG. 2, the specific point Q1 on the map is an intersection point between a first road St1 on which a vehicle travels and a second road St2 intersecting the first road St1. This intersection point is a point at which guidance on a course change is given by the navigation computing unit 3. The specific point Q1 preferably is a guidance point designated by the navigation computing unit 3. The specific point Q1 is not necessarily a guidance point at which such a course change occurs. Even if a vehicle travels straight on the first road St1, the intersection point is preferably set as a guidance point and the specific point Q1 so as to clearly indicate that the vehicle travels straight across the intersection point.

Naturally, even if an intersection point is not set as a guidance point by the navigation computing unit 3, the intersection point or the like on a course is not hindered from becoming the specific point Q1. For example, each intersection point may be registered as the specific point Q1 in the map database 5. In a case where the navigation computing unit 3 does not designate a guidance point, an intersection point may become the specific point Q1. In a case where the navigation computing unit 3 designates a guidance point, the guidance point may preferentially become the specific point Q1.

As described above, in a case where the specific point Q1 is designated, as illustrated in FIG. 2, the data extraction unit 7 extracts extracted structure data, which is data of the structures B contained in the extraction range E defined in advance with respect to the specific point Q1 as a datum, from map data (#1: data extraction step/function). The map data is acquired by the map data acquisition unit 6 in a map data acquisition step (not illustrated) prior to data extraction step #1 (map data acquisition function). In the embodiment, the extraction range E refers to a region having radius "d" centered around the specific point Q1. In data extraction step #1, structure data of N structures B, which are present in the vicinity defined by radius "d" from the specific point Q1, is extracted from the map data. In the embodiment, structure data of six structures (B1 to B6) is extracted. In this example, structure data of the structures B, at least a portion of which is contained in the extraction range E, is extracted.

Figure 7:
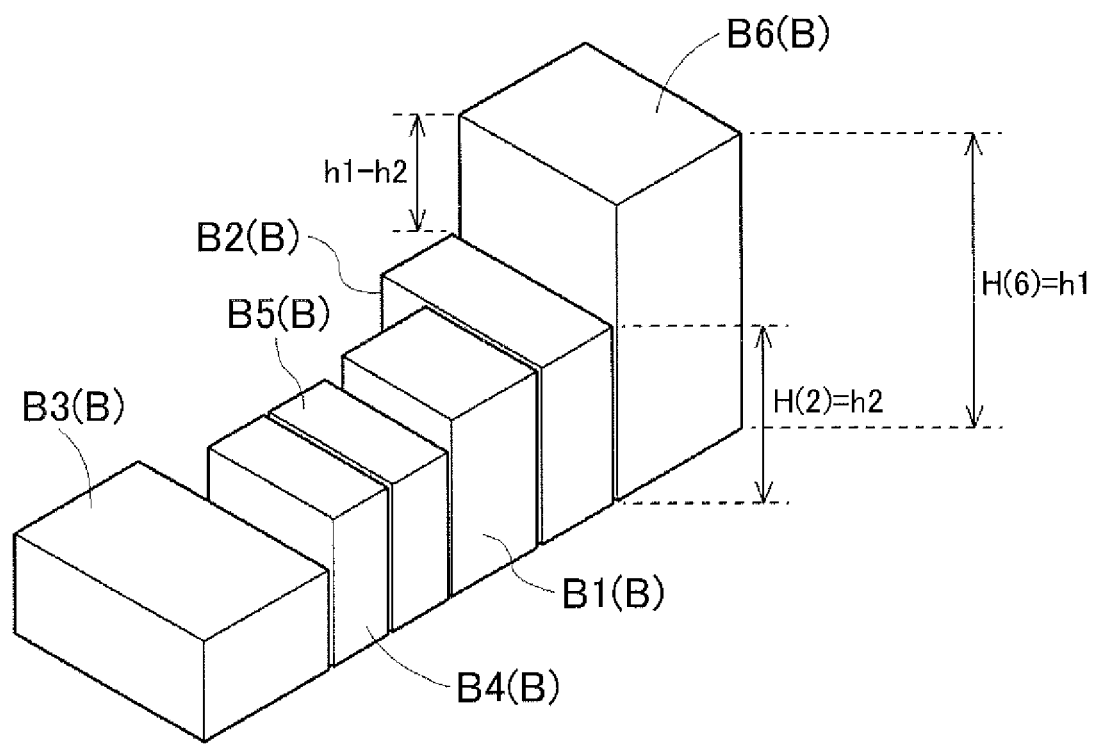
FIG. 7 is a view supplementing the flowchart in FIG. 6.

Subsequently, in Step #2h, the landmark selection unit 8 acquires an evaluated value of each item of structure data for a selection index. In the embodiment, the height of the structure B is a selection index, and height information H regarding each of the structures B is acquired. In the embodiment, as illustrated in FIG. 7, the height information H regarding each of the six structures (B1 to B6) is acquired. In this example, the height is decreased in the order of B6, B2, B1, B5, B4, and B3.

Subsequently, in Step #3h, the landmark selection unit 8 sets one or multiple structures B as a candidate structure in descending order starting from the greatest height. In this example, one structure (B6) having the greatest height is set as a candidate structure. The height information H regarding this candidate structure is assumed to indicate "h1". In Step #3h, the landmark selection unit 8 sets the height information H of a structure (comparison target structure), which has the greatest height among structures B other than the candidate structure from the multiple structures B corresponding to the extracted structure data, to "h2". In this example, since the structure B having the greatest height is a candidate structure, the height information H of the structure B (112) having a second-greatest height indicates "h2".

Subsequently, in Step #4h, the landmark selection unit 8 determines whether the difference between "h1" and "h2" is greater than selection threshold value Th_h for a height. That is, the landmark selection unit 8 determines whether height "h1" of the candidate structure is higher than height "h2" of the comparison target structure by selection threshold value Th_h or greater. In a case where the condition (h1−h2>Th_h) is satisfied, in Step #5h, the landmark selection unit 8 selects the landmark structure LM as a candidate structure. As described above, the height of the structure B is a selection index, and the height information H is an evaluated value. Accordingly, evaluation condition "h1−h2>Th_h" corresponds to a condition for determining whether an evaluated value of the candidate structure is different from an evaluated value of the comparison target structure by the threshold value (Th_h) or greater. Steps #2h to #5h correspond to landmark selection step #7 performed by the landmark selection unit 8 (landmark selection function). The landmark structure LM is selected by relative evaluation.

In a case where the landmark structure LM is selected, in display control step #6, the display controller 4 displays the landmark structure LM in an emphasized manner (display control function). In a case where the condition (h1−h2>Th_h) is not satisfied in Step #4h, it is determined that no especially prominent structure B is present among the structures B contained in the extraction range E, and the process is ended without selecting the landmark structure LM. In this case, all of the structures B are displayed without being emphasized.

In the aforementioned description, one structure B having the greatest height is selected as a candidate structure; however, multiple structures B may be selected as candidate structures. Structures B having the same height such as twin towers may be present close to each other. Accordingly, in a case where structures B having the same height are present in a range (range in which a height difference is less than 5%, a height difference is less than 10 m, or the like) defined in advance, multiple structures B may be set as candidate structures. Alternatively, multiple (a constant such as 2 or 3) structures B may be set as candidate structures all the times.

In the aforementioned example, in a case where height "h1" of a candidate structure is higher than the height "h2" of a structure having the greatest height among structures other than the candidate structure by threshold value Th_h or greater, the landmark structure LM is selected as the candidate structure. However, the invention is not limited to this example. A reference height, which is determined based on the heights of all of structures B other than a candidate structure among multiple structures B corresponding to extracted structure data, may be used as an evaluated value of a comparison structure. That is, in a case where height "h1" of a candidate structure is higher than the reference height by selection threshold value Th_h, the landmark structure LM may be selected as the candidate structure. The reference height can be set to an average value of the heights of all of structures B other than a candidate structure, or a median value of the heights of all of structures B other than a candidate structure. In the example illustrated in FIG. 7, the height of the structure "B5" is a median value.

Figure 6:
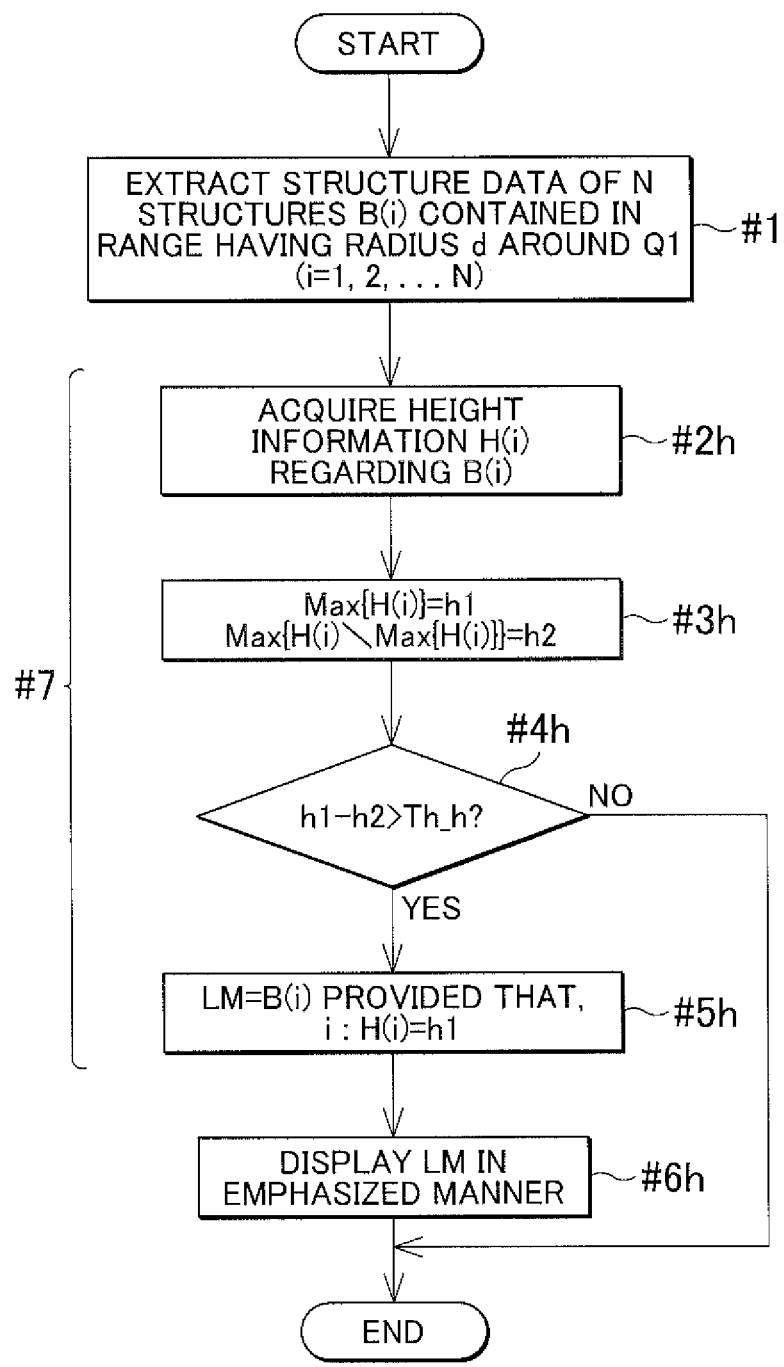
FIG. 6 is a flowchart illustrating an example in which a landmark structure is selected by using height.
Figure 8:
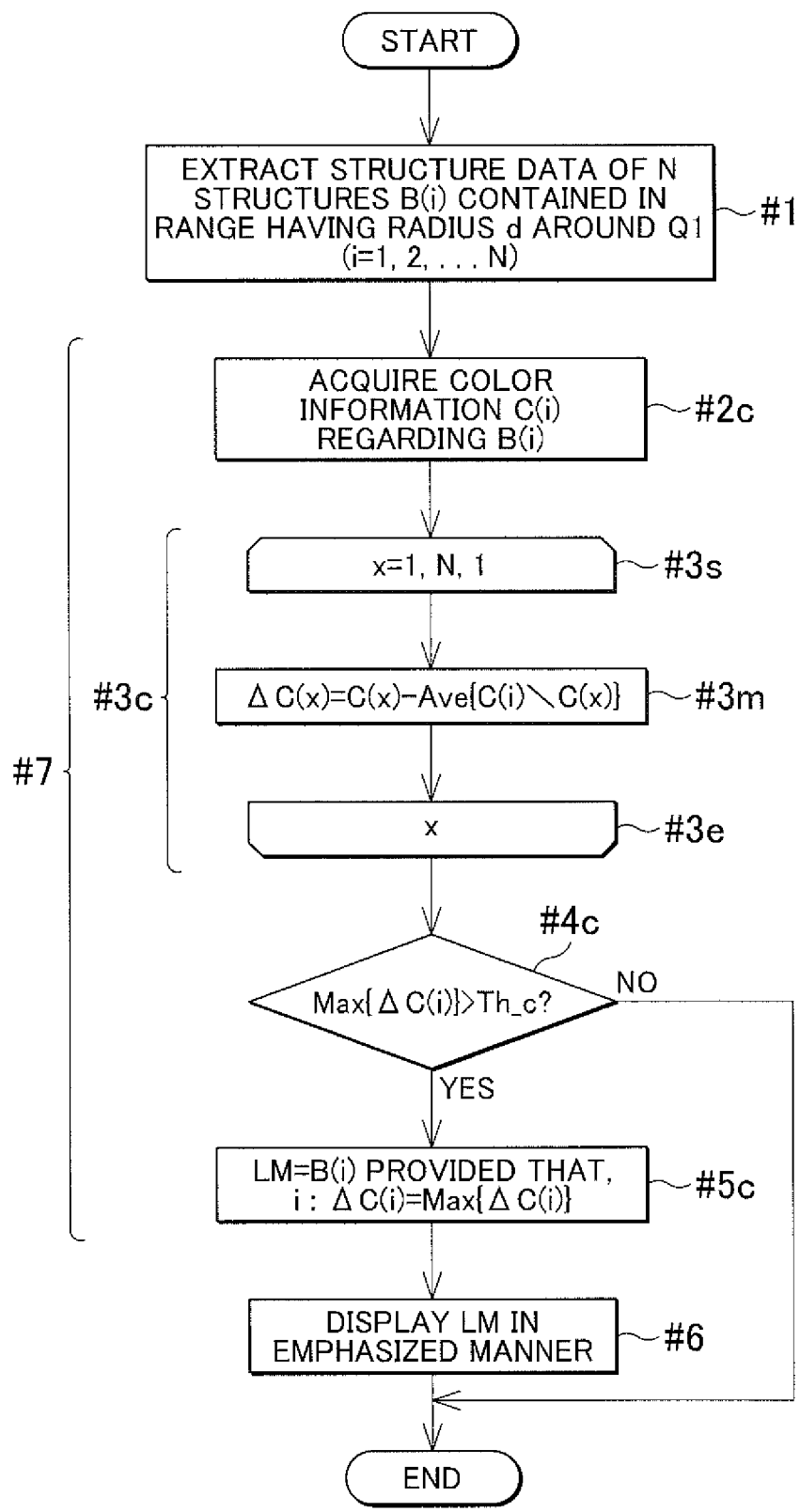
FIG. 8 is a flowchart illustrating an example in which a landmark structure is selected by using color.

In the aforementioned example given with reference to FIGS. 6 and 7, the landmark structure LM is selected by using the height of the structure B as a selection index. In contrast, a color index indicating the color of the structure B is also preferably used as a selection index. Hereinafter, an example, in which the landmark structure LM is selected by using color, will be described with reference to FIGS. 8 and 9, Since data extraction step #1 performed by the data extraction unit 7 is the same as that described with reference to FIG. 6, a description thereof will be omitted.

Figure 9:
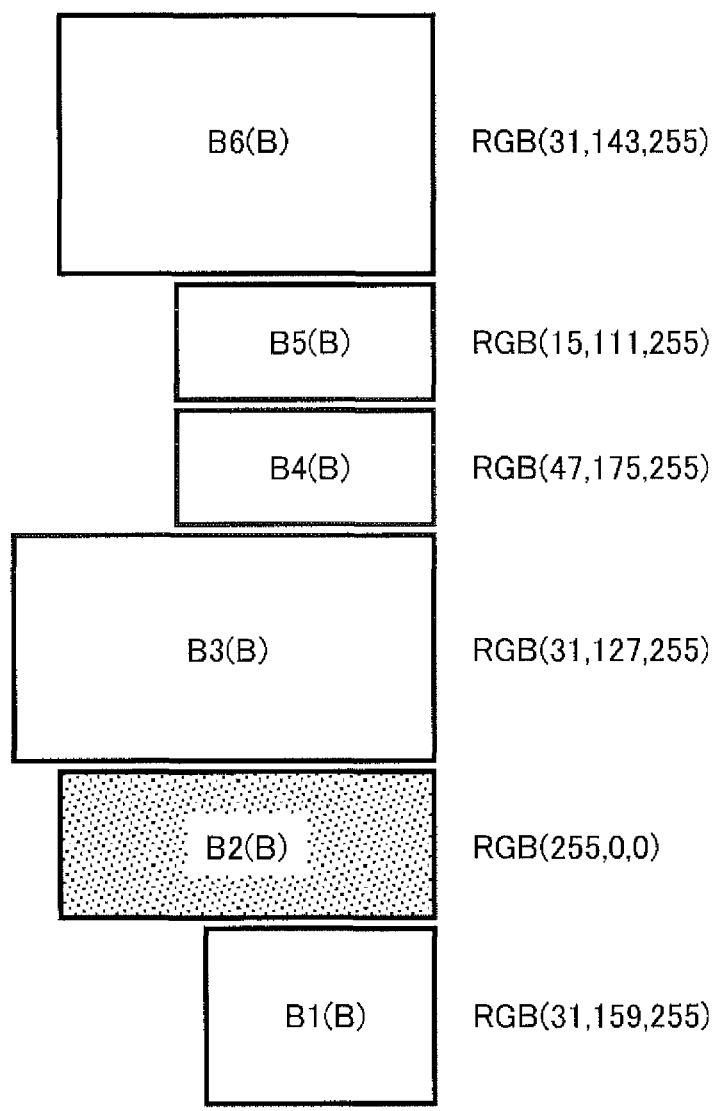
FIG. 9 is a view supplementing the flowchart in FIG. 8.

In Step #2c subsequent to data extraction step #1, the landmark selection unit 8 acquires an evaluated value of each structure for a selection index. In this example, the color index of the structure B is a selection index, and color information C regarding each of the structures B is acquired. In this example, as illustrated in FIG. 9, the color information C regarding each of the six structures (B1 to B6) is acquired. In this example, the color information C according to an RGB color system is exemplarily used; however, other color systems such as an L*a*b* color system and an XYZ color system may be used. In this example, each of R, G and B colors is expressed in terms of 256 gradations.

Subsequently, in Step #3c, the landmark selection unit S computes the difference ($\Delta C$) between the color index of one structure B (specific structure B) and the average color index of all of structures B other than the one structure B (specific structure B). Each of the extracted six structures (B1 to B6) is selected as a specific structure B such that six differences ($\Delta C$) are calculated. That is, Steps #3s to #3e are repeated N (N=6 in this example) times, and six differences ($\Delta C$) are calculated in Step #3m.

In a case where the structure "B1" is selected as a specific structure B in FIG. 9, an average value (reference color index) is an average value for the structures "B2 to B6". The reference color index value of the structure "B1" for the "R" color is "75.8", the reference color index value of the structure "B1" for the "G" color is "114.4", and the reference color index value of the structure "B1" for the "B" color is "204". Accordingly, the difference ($\Delta C$) for the "R" color is "31 −75.8=44.8", the difference ($\Delta C$) for the "G" color is "143−114.4=28.6", and the difference ($\Delta C$) for the "B" color is "255−204=51".

The following is computational results of the difference between the color index and the average value (reference color index) for each of the R, G, and B colors of the structures "B1 to B6" illustrated in FIG. 9. x=1, $\Delta C(x)$=(R, G, B)=(−44.8, 28.6, 51.0)x=2, $\Delta C(x)$=(R, G, B)=(−64.0, −9.8, 51.0)x=3, $\Delta C(x)$=(R, G, B)=(−25.6, 67.0, 51.0)x=4, $\Delta C(x)$=(R, G, B)=(−44.8, 9.4, 51.0)x=5, $\Delta C(x)$=(R, G, B)=(224.0, −143.0, −255.0)x=6, $\Delta C(x)$=(R, G, B)=(−44.8, 47.8, 51.0)

The following is computational results obtained by greying (monochromatizing) the differences for each of the R, G, and B colors. x=1,$\Box C(x)$=|$\Sigma$(R, G, B)|=|34.8|=34.8x=2,$\Box C$(x)=|$\Sigma$(R, G, B)|=|22.8|=22.8x=3,$\Box C(x)$=|$\Sigma$(R, G, B)|=|34.8|=92.4x=4,$\Box C(x)$=|$\Sigma$(R, G, B)|=|37.2|=15.6x=5, $\Box C(x)$=|$\Sigma$(R, G, B)|=|−174.0|=174.0x=6,$\Box C(x)$=|$\Sigma$(R, G, B)|=|44.4|=54.0

Subsequently, in Step #4c, the landmark selection unit 8 determines whether the maximum difference ($\Delta C$) selected from the six differences ($\Delta C$) is greater than selection threshold value Th_c for a color index. In a case where the condition (Max{$\Delta C(i)$}>Th_c) is satisfied, in Step #5c, the landmark selection unit 8 selects a structure B having the maximum difference ($\Delta C$) as the landmark structure LM. As described above, the color index of the structure B is a selection index, and the reference color index, which is the average value of the color indices of structures B other than a specific structure B which are used to compute the differences ($\Delta C$), is an evaluated value. Accordingly, evaluation condition "Max{$\Delta C(i)$}>Th_c" corresponds to a condition for determining whether the color index value of the specific structure is different from the reference color index value by the threshold value (Th_c) or greater. Steps #2c to #5c correspond to landmark selection step #7 performed by the landmark selection unit 8 (landmark selection function).

In a case where the landmark structure LM is selected, in display control step #6, the display controller 4 displays the landmark structure LM in an emphasized manner (display control function). In a case where the condition (Max{$\Delta C(i)$}>Th_c) is not satisfied in Step #4c, it is determined that no structure B prominent especially in colors is present among the structures B contained in the extraction range E, and the process is ended without selecting the landmark structure LM. In this case, all of the structures B are displayed without being emphasized.

In the aforementioned description, one structure B is selected as the landmark structure LM; however, in a case where structures B having the same color are present close to each other, multiple structures B may be selected as the landmark structures LM. For example, in a case where structures B having the same colors are present in a range (range in which the differences ($\Delta C$) are less than 5% to 10%, or range in which the difference is less than 16 gradations when the difference is converted into 256 gradations) defined in advance, multiple structures B may be selected as the landmark structures LM. Alternatively, multiple (a constant such as 2 or 3) structures B may be selected as the landmark structures LM all the times.

Other Embodiments

Hereinafter, other embodiments will be described. The invention is not limited to a case in which the configuration of each of embodiments to be described below is individually adopted, and the configuration can be combined with the configurations of the other embodiments insofar as there is no contradiction therebetween.

(1) In the aforementioned example, the landmark structure LM is selected whenever the specific point Q1 is designated. In contrast, the landmark structure LM may be determined for each intersection point in advance, and may be stored in the map database 5.

(2) In a case where the landmark structure LM is determined for each intersection point in advance, and is determined in the map database 5, and a point not registered in the map database 5 is designated as the specific point Q1, the landmark structure LM may be selected as described above. For example, in a case where a guidance point designated by the navigation computing unit 3 is not registered in the map database 5, the landmark structure LM is preferably selected by designating the guidance point as the specific point Q1.

Outline of Embodiments

Hereinafter, an outline of a map image display device (1) according to the aforementioned embodiments will be briefly described.

According to an aspect of the invention, there is provided a map image display device (1) that displays at least a map image on a display screen (20*a*), the device (1) including: a map data acquisition (6) unit configured to acquire map data; a display controller (4) configured to display a three-dimensional map image containing at least a road image and a structure image on the display screen (20*a*), based on the map data; a data extraction unit (7) configured to extract extracted structure data, which is data of structures (B) contained in an extraction range (E) defined in advance with respect to a specific point (Q1) as a datum, from the map data in a case where the specific point (Q1) is designated on a map; and a landmark selection unit (8) configured to select a structure, which corresponds to at least one item of extracted structure data among multiple extracted structure data items in a case where the multiple extracted structure data items are extracted, as a landmark structure (LM). The landmark selection unit (8) selects at least one structure (B), the evaluated value of which is different from evaluated values (H, C) of the other structures (B) by a selection threshold value (Th_h, Th_c) or greater for one or multiple selection indices (H, C) defined in advance, as the landmark structure (LM) based on the extracted structure data. The display controller (4) displays the structure image on the display screen (20*a*) in an emphasized manner such that the selected landmark structure (LM) offers visibility higher than visibility of non-emphasized structures (GB) which are structures other than the landmark structure (LM).

In this configuration, since the structure (B), the evaluated value of which is different from evaluated values of the other structures (B) by the selection threshold value (Th_h, Th_c) or greater, is displayed in an emphasized manner as the landmark structure (LM) among the structures (B) contained in the extraction range (E), a characteristic structure (B) different from the other structures (B) can be displayed on the display screen (20*a*) in a more prominent manner. The landmark structure (LM) is selected by relative evaluation based on whether or not the evaluated value of a structure (B), which becomes the landmark structure (LM), is different from the evaluated values of the other structures (B) (non-emphasized structures (GB)) by the selection threshold (Th_h, Th_c) or greater. That is, since the evaluated value of a structure (B), which becomes the landmark structure (LM), is not absolutely evaluated with respect to a predetermined reference, it is possible to reduce a possibility that many structures (B) satisfying the reference are present, and many landmark structures (LM) are selected. A structure (B), which is characteristic, in other words, prominent compared to other structures (B) (non-emphasized structures (GB)), can be selected as the landmark structure (LM) by relative evaluation. In this configuration, it is possible to properly select a structure (B) which becomes the landmark structure, and to display the structure (B) in an emphasized manner, even in a place where many structures (B) are present.

The selection index preferably contains the height of the structure (B). The landmark selection unit (8) preferably selects one or multiple structures (B) as a candidate structure in descending order starting from the greatest height. The landmark selection unit (8) preferably selects the candidate structure as the landmark structure (LM) in a case where the height of the candidate structure is greater than the height of a structure (B), which has the greatest height among structures (B) other than the candidate structure from multiple structures (B) corresponding to the extracted structure data, by the selection threshold value (Th_h) or greater. In this configuration, in a case where a height difference is relatively large, it is possible to properly select a structure (B) having a higher height as the landmark structure (LM). That is, it is possible to properly select a more prominent structure (B) as the landmark structure (LM).

According to another aspect, in a case where the selection index contains the height of the structure, preferably, the landmark selection unit (8) selects one or multiple structures (B) as a candidate structure in descending order starting from the greatest height, and selects the candidate structure as the landmark structure in a case where the height of the candidate structure is higher than a reference height, which is determined based on the heights of all of structures (B) other than the candidate structure among multiple structures (B) corresponding to the extracted structure data, by the selection threshold value (Th_h) or greater. It is possible to compare characteristics of a structure group which is a group of the structures (B) contained in the extraction range (E) to characteristics of an individual structure (B) by using the reference height as a comparison target, and to select a more distinctive structure (B) from the structure group. That is, it is possible to properly select a relatively prominent structure (B) from the structure group as the landmark structure (LM).

According to another aspect, the selection index preferably contains a color index indicating the color of the structure. The landmark selection unit (8) preferably selects a specific structure (B) as the landmark structure (LM) in a case where the color index value of the specific structure (B) is different from a reference color index value, which is determined based on the color indices of all of structures (B) other than the specific structure among multiple structures (B) corresponding to the extracted structure data, by the selection threshold value (The_c) or greater. In this configuration, it is possible to compare characteristics of colors of a structure group which is a group of the structures (B) contained in the extraction range (E) to characteristics of colors of an individual structure (B), and to select a more distinctive structure (B) from the structure group. That is, a structure (B), which is more prominent in colors, can be selected as the landmark structure (LM) from the structure group.

The display controller (4) preferably displays the structure image of the landmark structure (LM) in an emphasized manner by performing at least one of operations a, b, and c: operation "a" in which the structure image of the landmark structure (LM) is dynamically displayed, that is, which is periodically changed, and structure images of the non-emphasized structures (GB) are statically displayed in an image where a change is smaller than a change in which the structure image of the landmark structure is dynamically displayed; operation "b" in which at least one of brightness and chroma of the structure image of the landmark structure (LM) is set to be higher than at least one of brightness and chroma of the structure images of the non-emphasized structures (GB); and operation "c" in which the structure image of the landmark structure (LM) is set as a non-transparent image, and structure images of the non-emphasized structures (GB) are set as transparent images. In operation "a", it is possible to effectively make the landmark structure (LM) prominent by using dynamic display. In operation "b", it is possible to make the landmark structure (LM) prominent in colors. In operation "c", it is possible to make the landmark structure (LM) prominent without making non-emphasized structures (GB) other than the landmark structure (LM) prominent.

In a case where the map image display device (1) in the embodiment is applied to a navigation device (10), the navigation device (10) is capable of clearly providing a guidance point to a user. According to an aspect, preferably, the navigation device (10) configured to guide a path based on a computational result from a path guiding unit (3) includes the map image display device (1) according to the embodiments, and a specific point (Q1) is a guidance point designated by the path guiding unit (3).

Various technical characteristics of the map image display device (1) can also be applied to a map image display method and a map image display program. Hereinafter, representative aspects will be exemplarily illustrated. The map image display method is capable of having various steps including the characteristics of the map image display device (1). The map image display program is capable of causing a computer to realize various functions including the characteristics of the map image display device (1). Naturally, the map image display method and the map image display program are also capable of having effects of the map image display device (1). Various additional characteristics exemplarily illustrated as preferred aspects of the map image display device (1) can also be incorporated into the map image display method or the map image display program. The method and the program are capable of having effects corresponding to the additional characteristics.

According to a preferred aspect of the invention, there is provided a map image display method in which at least a map image is displayed on a display screen (20a), the method including: a map data acquisition step in which a map data acquisition unit (6) acquires map data; a display control step (#6) in which a display controller (4) displays a three-dimensional map image containing at least a road image and a structure image on the display screen (20a), based on the map data; a data extraction step (#1) in which a data extraction unit (7) extracts extracted structure data, which is data of structures (B) contained in an extraction range (E) defined in advance with respect to a specific point (Q1) as a datum, from the map data in a case where the specific point (Q1) is designated on a map; and a landmark selection step (#7) in which a landmark selection unit (8) selects a structure (B), which corresponds to at least one item of extracted structure data among multiple extracted structure data items in a case where the multiple extracted structure data items are extracted, as a landmark structure (LM). In the landmark selection step (#7), at least one structure (B), the evaluated value of which is different from evaluated values of the other structures (B) by a selection threshold value (Th_h, Th_c) or greater for one or multiple selection indices (H, C) defined in advance, as the landmark structure (LM) based on the extracted structure data. In the display control step (#6), the structure image is displayed on the display screen (20a) in an emphasized manner such that the selected landmark structure (LM) offers visibility higher than visibility of non-emphasized structures (GB) which are structures (B) other than the landmark structure (LM).

According to a preferred aspect of the invention, there is provided a map image display program by which at least a map image is displayed on a display screen (20a), the program causing a computer to realize: a map data acquisition function in which a map data acquisition unit (6) acquires map data; a display control function (#6) in which a display controller (4) displays a three-dimensional map image containing at least a road image and a structure image on the display screen (20a) based on the map data; a data extraction function (#1) in which a data extraction unit (7) extracts extracted structure data, which is data of structures (B) contained in an extraction range (E) defined in advance with respect to a specific point (Q1) as a datum, from the map data in a case where the specific point (Q1) is designated on a map; and a landmark selection function (#7) in which a landmark selection unit (8) selects a structure (B), which corresponds to at least one item of extracted structure data among multiple extracted structure data items in a case where the multiple extracted structure data items are extracted, as a landmark structure (LM). In the landmark selection function (#7), at least one structure (B), the evaluated value of which is different from evaluated values of the other structures (B) by a selection threshold value (Th_h, Th_c) or greater, as the landmark structure (LM) based on the extracted structure data the evaluated value relating to one or multiple selection indices (H, C) defined in advance. In the display control function (#6), the structure image is displayed on the display screen (20a) in an emphasized manner such that the selected landmark structure (LM) offers visibility higher than visibility of non-emphasized structures (GB) which are structures (B) other than the landmark structure (LM).

The invention can be applied to a map image display device configured to display a map image on a display screen, or to a navigation device.

What is claimed is:
1. A map image display device that displays at least a map image on a display screen, the device comprising:
   a map database storing: (i) map data, and (ii) landmark structure information determined in advance for each of predetermined intersections, the landmark structure information identifying one structure for each predetermined intersection, an evaluated value of which is different from evaluated values of other structures within a predetermined range of the predetermined intersection by a selection threshold value or greater, as the landmark structure, the evaluated value relating to one or multiple selection indices defined in advance;
   a map data acquisition unit configured to acquire map data;
   a display controller configured to display a three-dimensional map image containing at least a road image and a structure image on the display screen, based on the map data;
   a data extraction unit configured to extract extracted structure data, which is data of structures contained in an extraction range defined in advance with respect to a specific point as a datum, from the map data in a case where the specific point is designated on a map; and
   a landmark selection unit configured to:
   (i) for specific points corresponding to the predetermined intersections, select a structure based on the predetermined landmark structure information determined in advance, and

(ii) for specific points that do not correspond to the predetermined intersections, select a structure, which corresponds to at least one item of extracted structure data among multiple extracted structure data items in a case where the multiple extracted structure data items are extracted, as the landmark structure, wherein the landmark selection unit selects at least one structure, an evaluated value of which is different from evaluated values of other structures in the extraction range by a selection threshold value or greater, as the landmark structure based on the extracted structure data, the evaluated value relating to the one or multiple selection indices defined in advance and wherein the display controller displays the structure image on the display screen in an emphasized manner such that the selected landmark structure offers visibility higher than visibility of non-emphasized structures which are structures other than the landmark structure.

2. The map image display device according to claim 1, wherein the selection index contains a height of the structure, wherein the landmark selection unit selects one or multiple structures as a candidate structure in descending order starting from the greatest height, and wherein the landmark selection unit selects the candidate structure as the landmark structure in a case where a height of the candidate structure is higher than the height of the structure, which has the greatest height among structures other than the candidate structure from multiple structures corresponding to the extracted structure data, by the selection threshold value or greater.

3. The map image display device according to claim 1, wherein the selection index contains a height of the structure, wherein the landmark selection unit selects one or multiple structures as a candidate structure in descending order of heights from the greatest height, and wherein the landmark selection unit selects the candidate structure as the landmark structure in a case where a height of the candidate structure is higher than a reference height, which is determined based on the heights of all of structures other than the candidate structure among multiple structures corresponding to the extracted structure data, by the selection threshold value or greater.

4. The map image display device according to claim 1, wherein the selection index contains a color index indicating the color of the structure, and wherein the landmark selection unit selects a specific structure as the landmark structure in a case where a color index value of the specific structure is different from a reference color index value, which is determined based on the color indices of all of structures other than the specific structure among multiple structures corresponding to the extracted structure data, by the selection threshold value or greater.

5. The map image display device according to claim 1, wherein the display controller displays the structure image of the landmark structure in an emphasized manner by performing at least one of operations: an operation in which the structure image of the landmark structure is dynamically displayed, that is, which is periodically changed, and structure images of the non-emphasized structures are statically displayed in an image where a change is smaller than a change in which the structure image of the landmark structure is dynamically displayed; an operation in which at least one of brightness and chroma of the structure image of the landmark structure is set to be higher than at least one of brightness and chroma of the structure images of the non-emphasized structures; and an operation in which the structure image of the landmark structure is set as a non-transparent image, and structure images of the non-emphasized structures are set as transparent images.

6. A navigation device comprising:

the map image display device according to claim 1, wherein the navigation device guides a path based on a computational result from a path guiding unit, and wherein the specific point is a guidance point designated by the path guiding unit.

7. A map image display method in which at least a map image is displayed on a display screen, the method comprising:

storing in advance in a map database: (i) map data, and (ii) landmark structure information determined in advance for each of predetermined intersections, the landmark structure information identifying one structure for each predetermined intersection, an evaluated value of which is different from evaluated values of other structures within a predetermined range of the predetermined intersection by a selection threshold value or greater, as the landmark structure, the evaluated value relating to one or multiple selection indices defined in advance;

acquiring map data via a map data acquisition unit;

displaying a three-dimensional map image containing at least a road image and a structure image on the display screen, via a display controller based on the map data;

extracting extracted structure data, which is data of structures contained in an extraction range defined in advance with respect to a specific point as a datum, from the map data in a case where the specific point is designated on a map, via a data extraction unit; and selecting a structure:
(i) for specific points corresponding to the predetermined intersections, selecting the structure based on the landmark structure information determined in advance, and
(ii) for specific points that do not correspond to the predetermined intersection, selecting a structure which corresponds to at least one item of extracted structure data among multiple extracted structure data items in a case where the multiple extracted structure data items are extracted, as the landmark structure via a landmark selection unit, wherein when a structure corresponding to the extracted structure data is selected as a landmark structure, at least one structure, an evaluated value of which is different from evaluated values of other structures in the extraction range by a selection threshold value or greater, as the landmark structure based on the extracted structure data, the evaluated value relating to the one or multiple selection indices defined in advance, and wherein when the display controller displays a three-dimensional map image containing at least a road image and a structure image on the display screen based on the map data, the structure image is displayed on the display screen in an emphasized manner such that the selected landmark structure offers visibility higher than visibility of non-emphasized structures which are structures other than the landmark structure.

\* \* \* \* \*